(12) United States Patent
Welch

(10) Patent No.: US 6,669,455 B2
(45) Date of Patent: Dec. 30, 2003

(54) FLUID-PUMPING SYSTEM EMPLOYING AIR-DRIVEN PUMP AND EMPLOYING AT LEAST ONE PULSATION DAMPENER

(76) Inventor: Elmer Scott Welch, P.O. Box 879, Silver Lake, WI (US) 53170

(*) Notice: Subject to any disclaimer, the term of this patent is extended or adjusted under 35 U.S.C. 154(b) by 39 days.

(21) Appl. No.: 10/238,055

(22) Filed: Sep. 9, 2002

(65) Prior Publication Data

US 2003/0143088 A1 Jul. 31, 2003

Related U.S. Application Data

(60) Provisional application No. 60/353,709, filed on Jan. 31, 2002.

(51) Int. Cl.$^7$ ................................................ F04B 11/00
(52) U.S. Cl. ...................................................... 417/540
(58) Field of Search ................ 138/26, 30; 137/565.34, 137/593; 417/540, 543

(56) References Cited

U.S. PATENT DOCUMENTS

| 422,936 | A | | 3/1890 | Hanson | |
|---|---|---|---|---|---|
| 1,627,257 | A | | 5/1927 | Stevens | |
| 2,307,566 | A | | 1/1943 | Browne | |
| 2,315,179 | A | * | 3/1943 | Allender | 417/543 |
| 2,474,512 | A | * | 6/1949 | Bechtold et al. | 417/540 |
| 2,565,374 | A | * | 8/1951 | Kitchel | 417/543 |
| 2,773,455 | A | * | 12/1956 | Mercier | 417/540 |
| 2,927,658 | A | | 3/1960 | Slater, Jr. | |
| 3,741,692 | A | * | 6/1973 | Rupp | 417/540 |
| 3,804,107 | A | | 4/1974 | Kozlov et al. | |
| 4,445,829 | A | | 5/1984 | Miller | |
| 4,979,441 | A | | 12/1990 | Welch et al. | |
| 5,868,168 | A | | 2/1999 | Mott et al. | |

* cited by examiner

Primary Examiner—Michael Koczo
(74) Attorney, Agent, or Firm—Wood, Phillips, Katz, Clark & Mortimer

(57) ABSTRACT

In a fluid-pumping system comprising a pump and a pulsation dampener, which is arranged to dampen pressure pulsations, the pump is driven by air delivered at a regulated pressure. The pulsation dampener is arranged to be charged via an associated regulator, which is arranged to regulate the charging air pressure by reference to the air pressure in an averaging tank. Preferably, the pulsation dampener comprises two apertured walls, between which a diaphragm is mounted, one such wall being mounted so as to limit displacement of the diaphragm toward the air-side chamber and the other wall mounted so as to limit displacement of the diaphragm toward the fluid-side chamber. Two similar dampeners may be employed, one to dampen pressure surges and the other to dampen pressure drops.

12 Claims, 3 Drawing Sheets

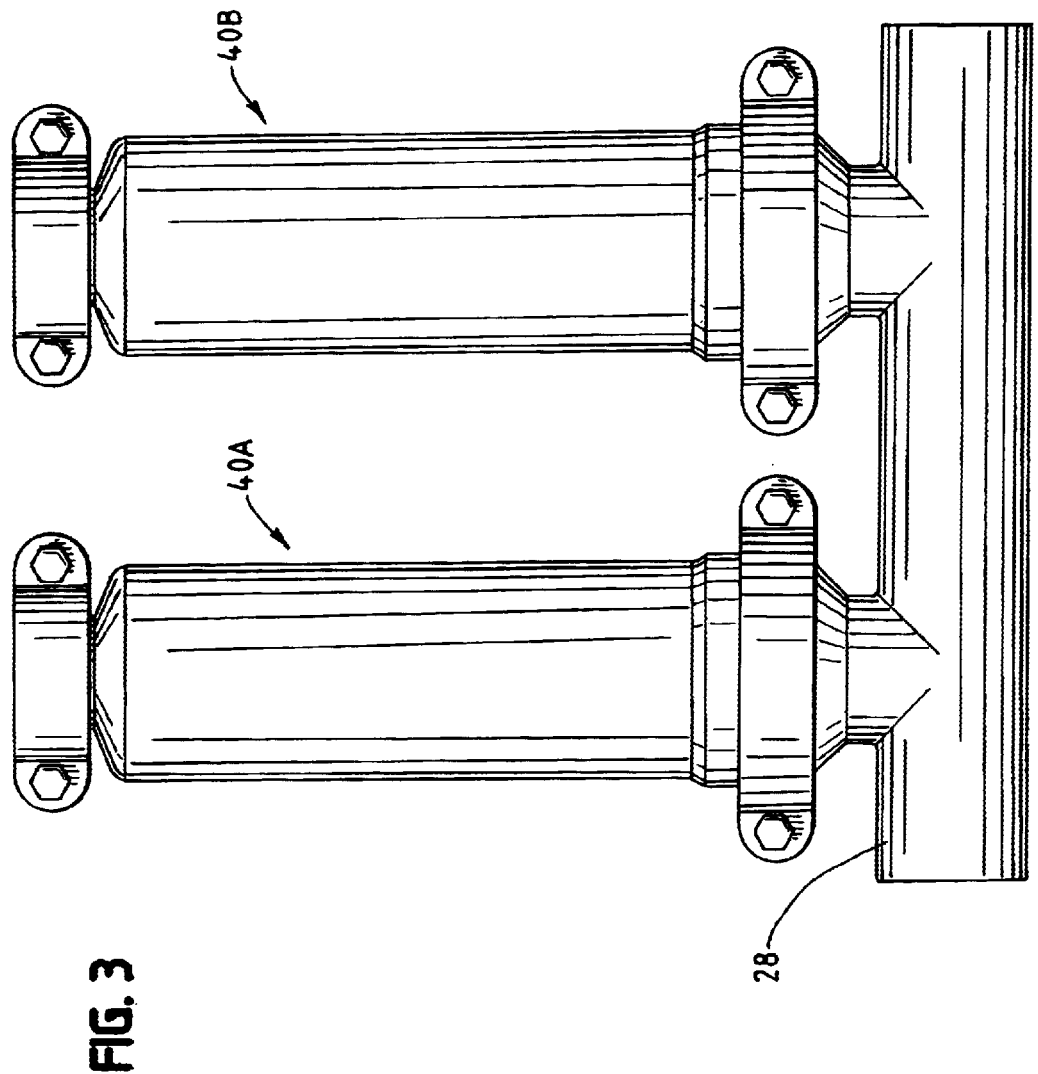

ly, each
FLUID-PUMPING SYSTEM EMPLOYING AIR-DRIVEN PUMP AND EMPLOYING AT LEAST ONE PULSATION DAMPENER

CROSS-REFERENCE TO RELATED APPLICATION

This application claims the priority of U.S. Provisional Patent Application Serial No. 60/353,709, which was filed on Jan. 31, 2002, and the disclosure of which is incorporated herein by reference.

TECHNICAL FIELD OF THE INVENTION

This invention pertains to a fluid-pumping system employing an air-driven pump, which may be a double-diaphragm pump, and employing at least one pulsation dampener to dampen pressure pulsations at an outlet of the air-driven pump.

BACKGROUND OF THE INVENTION

In fluid-pumping systems, pressure pulsations are known to occur in fluids being pumped. It is known to employ pulsation dampeners to dampen such fluctuations. Such pulsations are known to occur even if air-driven pumps are employed, whether single-diaphragm pumps, double-diaphragm pumps, or piston pumps.

One example of a pulsation dampener is disclosed in U.S. Pat. No. 4,979,441. The pulsation dampener disclosed therein employs an inner, perforated tube, an outer, rigid tube, and an intermediate, elastomeric sleeve. Gas pressure in a space between the outer, rigid tube and the intermediate, elastomeric sleeve dampens pressure pulsations in a fluid being pumped through the inner, perforated tube. With the pulsation dampener disclosed therein, it is difficult to compensate for minute losses of gas pressure in the space between the outer, rigid tube and the intermediate, elastomeric sleeve.

SUMMARY OF THE INVENTION

This invention provides a fluid-pumping system comprising a pump having an inlet and an outlet and a pulsation dampener arranged to dampen pressure pulsations at the outlet. The pump is arranged to be driven by air delivered to the pump at a regulated pressure. The pulsation dampener is arranged to be charged by air delivered at a regulated pressure via a pressure-reducing regulator, which is arranged to regulate the air pressure in the charging line by reference to the average pressure of the air driving the pump.

Preferably, the pressure-reducing regulator is arranged to regulate the air pressure in the charging line to a selected differential above or below the average pressure of the air driving the pump. In a preferred embodiment, wherein an averaging tank is connected to a driving line, via an orifice, the pressure-reducing regulator is arranged to regulate the air pressure in the charging line by reference to the air pressure in the averaging tank. The fluid-pumping system may comprise two pulsation dampeners, i.e., one arranged to dampen pressure drops at the outlet and another arranged to dampen pressure surges at the outlet.

Preferably, each pulsation dampener comprises an air-side chamber, which is adapted to be charged through the charging line, a fluid-side chamber, which is adapted to communicate with the outlet conduit so that the fluid pumped through the outlet conduit can enter the fluid-side chamber, and an elastomeric diaphragm, which is mounted so as to separate the outer and fluid-side chambers. Preferably, each pulsation dampener comprises two apertured walls, between which the diaphragm is mounted. One said wall is mounted so as to limit displacement of the diaphragm in a direction to decrease the volume of the air-side chamber and, thereby, to increase the volume of the fluid-side chamber. The other wall is mounted so as to limit displacement of the diaphragm in a direction to increase the volume of the air-side chamber and, thereby, to decrease the volume of the fluid-side chamber. Preferably, outside said one wall, the air-side chamber has a volume at least three times larger than the volume between the apertured walls.

BRIEF DESCRIPTION OF THE DRAWINGS

FIG. 3, on an intermediate scale, is a layout of two pulsation dampeners and adjacent portions of an outlet line, in a modified system embodying this invention.

DETAILED DESCRIPTION OF THE ILLUSTRATED EMBODIMENT

Figure 1:
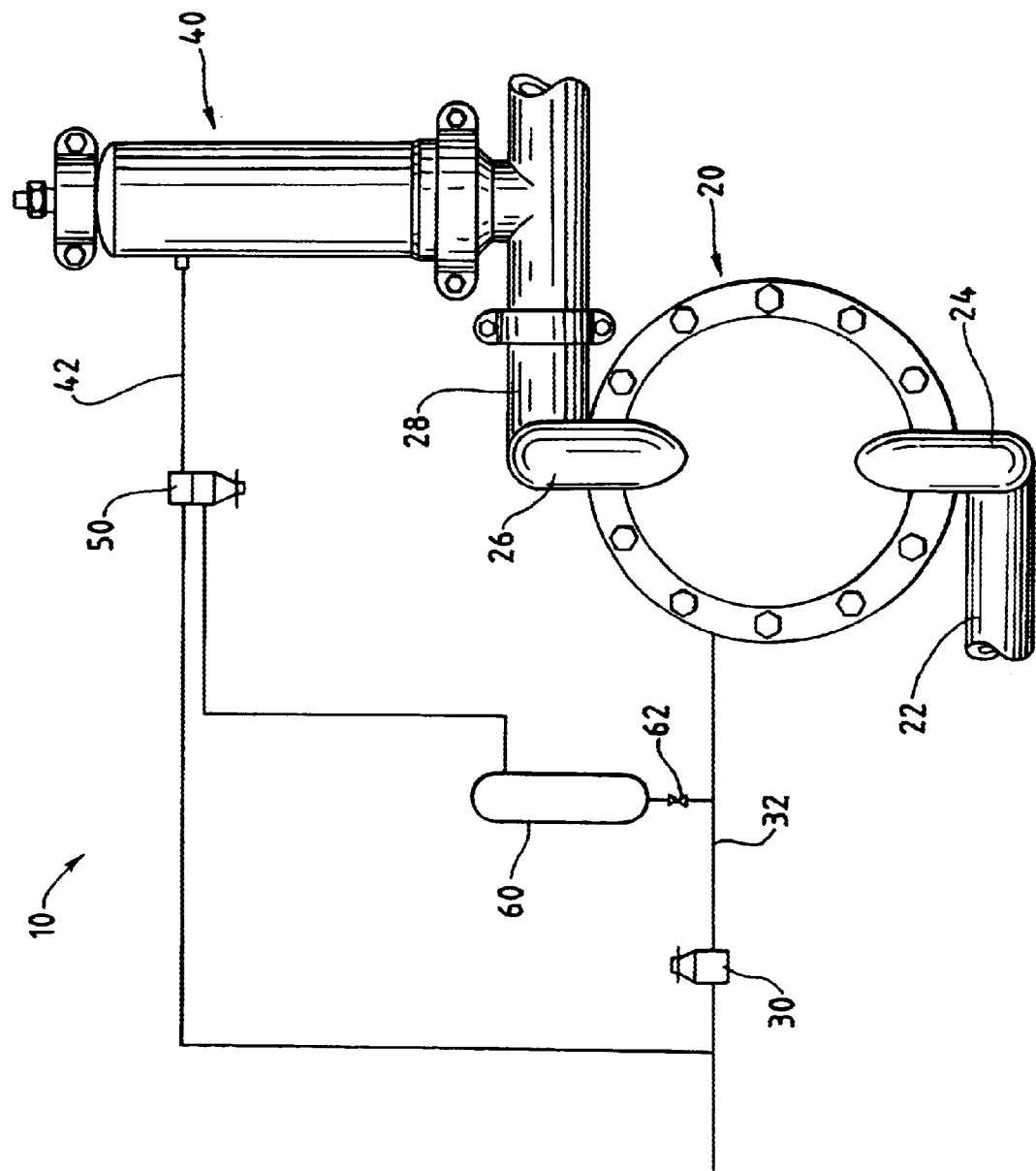
FIG. 1 is a partly schematic layout of a fluid-pumping system employing an air-driven pump, employing a pulsation dampener, and embodying this invention.

As illustrated in FIG. 1, a fluid-pumping system 10 comprises an air-driven pump 20, which may be a double-diaphragm pump, which is arranged to draw a fluid through an inlet conduit 22, into an inlet 24 of the pump 20, and which is arranged to pump the fluid from an outlet 26 of the pump 20, through an outlet conduit 28. The pump 20 is driven by air delivered to the pump 20 through a driving line 32, via a pressure-reducing regulator 30, which receives air at a higher pressure from a source (not shown) and which reduces the air pressure to a regulated pressure suitable for driving the pump 20.

Moreover, the system 10 comprises a pulsation dampener 40, which is arranged to dampen pulsations in the pressure of the fluid being pumped through the outlet conduit 28. The pulsation dampener 40 is charged by air delivered to the pulsation dampener 40, through a charging line 42, via a pressure-reducing regulator 50, which receives air at a higher pressure from the same source and which reduces the air pressure in the charging line 42 to a regulated pressure by reference to the average pressure of the air driving the pump 20.

As illustrated in FIG. 1, an averaging tank 60 is connected to the driving line 32, via an orifice 62, and the pressure-reducing regulator 50 is arranged to regulate the air pressure in the charging line 42 by reference to the air pressure in the averaging tank 60. Alternatively, the average pressure of the air driving the pump 20 may be electronically measured via a pressure transmitter (not shown) which is connected to the driving line 32 and which is arranged to average multiple pressure readings and to control the pressure-reducing regulator 50 accordingly.

Figure 2:
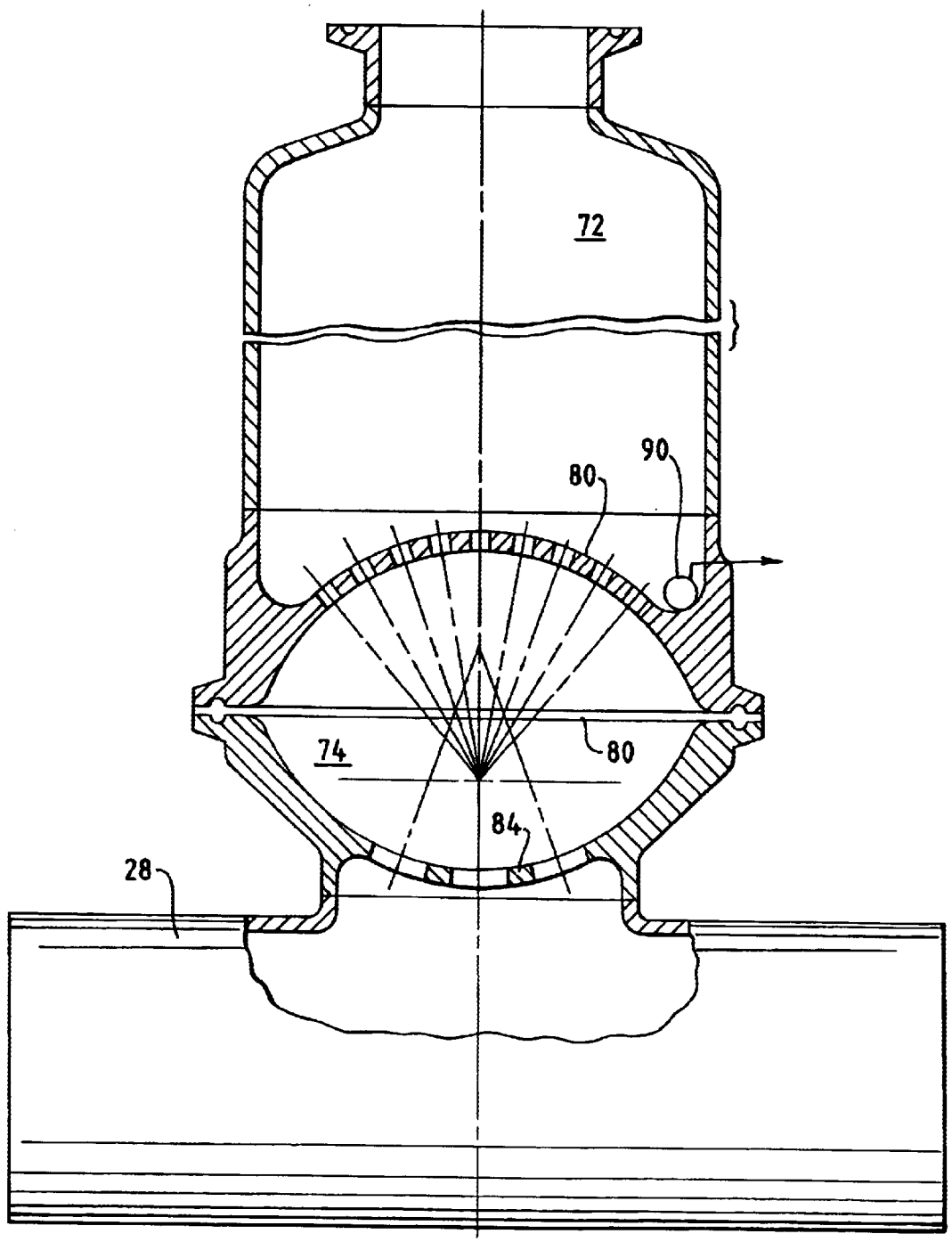
FIG. 2, on a larger scale, is a partly cross-sectioned, partly broken-away view of the pulsation dampener and of adjacent portions of an outlet conduit, in the system of FIG. 1.

As illustrated in FIG. 2, the pulsation dampener 40 comprises an air-side chamber 72, which has a variable volume and which is charged through the charging line 42, a fluid-side chamber 74, which has a variable volume and which communicates with the outlet 26 of the pump 20, via the outlet conduit 28, so that the fluid pumped through the outlet 26 of the pump 20 can enter the fluid-side chamber 74, and an elastomeric diaphragm 80, which is mounted so as to separate the air-side chamber 72 and the fluid-side chamber 74. The pulsation dampener 40 comprises two apertured walls, between which the diaphragm 80 is mounted. One said wall 82 is mounted so as to limit displacement of the diaphragm 80 in a direction to decrease the volume of the air-side chamber 72 and, thereby, to increase the volume of the fluid-side chamber 74. The other wall 84 is mounted so as to limit displacement of the diaphragm 80 in a direction to increase the volume of the air-side chamber 74 and, thereby, to decrease the volume of the fluid-side chamber 74. Moreover, outside the apertured wall 82, the air-side chamber 72 has a volume at least three times larger than the volume between the apertured walls 82, 84.

If the pressure of the fluid entering the fluid-side chamber 74 from the outlet conduit 28 surges above the pressure of the air in the air-side chamber 72, the diaphragm 80 is displaced so as to decrease the volume of the air-side chamber 72 and so as to increase the volume of the fluid-side chamber 74, whereby to dampen the pressure surge in the fluid being pumped through the outlet conduit 28. If the pressure of the fluid entering the fluid-side chamber 74 from the outlet conduit 28 drops below the pressure of the air in the air-side chamber 72, the diaphragm 80 is displaced so as to increase the volume of the air-side chamber 72 and so as to decrease the volume of the fluid-side chamber 74, whereby to dampen the pressure drop in the fluid being pumped through the outlet conduit 28. Depending upon whether the air pressure in the air-side chamber 72 is regulated to a normal pressure above, below, or approximately at the normal pressure of the fluid in the fluid-side chamber 74, via the pressure-reducing regulator 50, the pulsation dampener 40 can be thus controlled so as to dampen pressure surges in the fluid being pumped through the outlet conduit 28, so as to dampen pressure drops therein, or so as to dampen pressure surges therein and pressure drops therein.

Because of the low mass of the diaphragm 80 and the large volume of air in the air-side chamber 72, the pulsation dampener 40 responds quickly to pressure fluctuations in the fluid being pumped through the outlet conduit 28. Moreover, even if minute losses of air in the air-side chamber 72 occur, the pressure-reducing regulator 50 compensates for those losses so as to maintain the air pressure in the air-side chamber 72.

If the fluid being pumped by the system 10 is a liquid or employs a liquid carrier, the pulsation dampener 40 may be advantageously provided with a liquid sensor 90, which is mounted in the air-side chamber 72, which is arranged to detect any liquid that may have entered the air-side chamber 72, and which is arranged, if the sensor 90 detects any liquid, to activate an alarm signal, shut down the system 10, or both.

As illustrated in FIG. 3, two pulsation dampeners 40A, 40B, are employed in a modified system 10A, each being similar to the pulsation dampener 40, each being controlled similarly, and each communicating similarly with the outlet 26 of the pump 20, via the outlet conduit 28. The pulsation dampener regulator 40A can be thus controlled so as to dampen pressure surges in the fluid being pumped through the outlet conduit 28. The pulsation dampener 40B can be thus controlled so as to dampen pressure drops in the fluid being pumped through the outlet conduit 28.

What is claimed is:

1. A fluid-pumping system comprising a pump having an inlet and an outlet and a pulsation dampener arranged to dampen pressure pulsations at the outlet, wherein the pump is arranged to be driven by air delivered at a regulated pressure via a pressure-reducing regulator associated with the pump, wherein the fluid-pumping system further comprises means for averaging the pressure of the air driving the pump wherein the pulsation dampener is arranged to be charged by air delivered to the pulsation dampener through a charging line, at a regulated pressure, via a pressure-reducing regulator associated with the pulsation dampener, and wherein the pressure-reducing regulator associated with the pulsation dampener is arranged to regulate the pressure of the air charging the pulsation dampener by reference to the average pressure of the air driving the pump.

2. The fluid-pumping system of claim 1 wherein the pressure-reducing regulator associated with the pulsation dampener is arranged to regulate the air pressure in the charging line to a selected differential above or below the average pressure of the air driving the pump.

3. A fluid-pumping system comprising a pump having an inlet and an outlet and a pulsation dampener arranged to dampen pressure pulsations at the outlet, wherein the pump is arranged to be driven by air delivered to the pump through a driving line, which is charged with air at a regulated pressure via a pressure-reducing regulator associated with the pump, wherein an averaging tank is connected to the driving line via an orifice, wherein the pulsation dampener is arranged to be charged by air delivered to the pulsation dampener, at a regulated pressure, via a pressure-reducing regulator associated with the pulsation dampener, and wherein the pressure-reducing regulator associated with the pulsation dampener is arranged to regulate the air pressure in the charging line by reference to the air pressure in the averaging tank.

4. The fluid-pumping system of claim 3 wherein the pressure reducing regulator associated with the pulsation dampener is arranged to regulate the air pressure in the charging line to a selected differential above or below the air pressure in the averaging tank.

5. The fluid-pumping system of claim 1, 2, 3, or 4 wherein the pulsation dampener comprises an air-side chamber, which is adapted to be charged through the charging line, a fluid-side chamber, which is adapted to communicate with the outlet so that the fluid pumped through the outlet can enter the fluid-side chamber, and an elastomeric diaphragm, which is mounted so as to separate the air-side and fluid-side chambers.

6. The system of claim 5 wherein the pulsation dampener comprises two apertured walls, between which a diaphragm is mounted, wherein one said wall is mounted so as to limit displacement of the diaphragm in a direction to decrease the volume of the air-side chamber and, thereby, to increase the volume of the fluid-side chamber, and wherein the other wall is mounted so as to limit displacement of the diaphragm in a direction to increase the volume of the air-side chamber and, thereby, to decrease the volume of the fluid-side chamber.

7. A fluid-pumping system comprising a pump having an inlet and an outlet, a pulsation dampener arranged to dampen pressure drops at the outlet, and a pulsation dampener arranged to dampen pressure surges at the outlet, wherein the pump is arranged to be driven by air delivered to the pump through a driving line, which is charged with air through a charging line, at a regulated pressure, via a pressure-reducing regulator associated with the pump, and wherein each pulsation dampener is arranged to be charged by air delivered to the pulsation dampener through a charging line at a regulated pressure via an associated pressure-reducing regulator, which is arranged to regulate the air pressure in the charging line by reference to the average air pressure in the driving line.

8. The fluid-pumping system of claim 7 wherein the pressure-reducing regulator associated with the pulsation dampener adapted to dampen pressure drops is arranged to regulate the air pressure in the charging line to a selected differential below the average air pressure in the driving line and wherein the pressure-reducing regulator associated with the pulsation dampener adapted to dampen pressure surges is arranged to regulate the air pressure in the charging line to a selected differential above the average air pressure in the driving line.

9. A fluid-pumping system comprising a pump having an inlet and an outlet, a pulsation dampener arranged to dampen pressure drops at the outlet, and a pulsation dampener arranged to dampen pressure surges at the outlet, wherein the pump is arranged to be driven by air delivered to the pump through a driving line, which is charged with air at a regulated pressure, wherein an averaging tank is connected to the driving line via an orifice, and wherein each pulsation dampener is arranged to be charged by air delivered to said pulsation dampener through a charging line at a regulated pressure via an associated pressure-reducing regulator, which is arranged to regulate the air pressure in the charging line by reference to the air pressure in the averaging tank.

10. The fluid-pumping system of claim 9 wherein the pressure-reducing regulator associated with the pulsation dampener adapted to dampen pressure drops is arranged to regulate the air pressure in the charging line to a selected differential below the air pressure in the averaging tank and wherein the pressure-reducing regulator associated with the pulsation dampener adapted to dampen pressure surges is arranged to regulate the air pressure in the charging line to a selected differential above the air pressure in the averaging tank.

11. The fluid-pumping system of claim 7, 8, 9, or 10 wherein each pulsation dampener comprises an air-side chamber, which is adapted to be charged through the charging line, a fluid-side chamber, which is adapted to communicate with the outlet so that the fluid pumped through the outlet can enter the fluid-side chamber, and an elastomeric diaphragm, which is mounted so as to separate the air-side and fluid-side chambers.

12. The system of claim 11 wherein each pulsation dampener comprises two apertured walls, between which the diaphragm is mounted, one said wall being mounted so as to limit displacement of the diaphragm toward the air-side chamber and the other wall being mounted so as to limit displacement of the diaphragm toward the fluid-side chamber.

* * * * *